C. L. GRISWOLD.
Gimlet Handles.
No. 143,142.  Patented September 23, 1873.
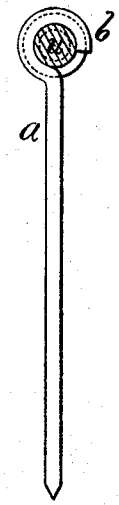
Fig. 1.
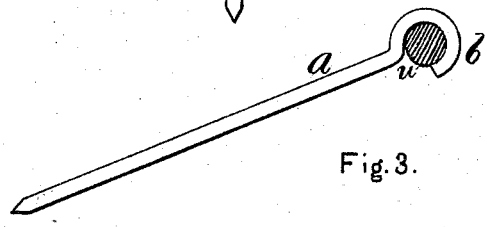
Fig. 3.
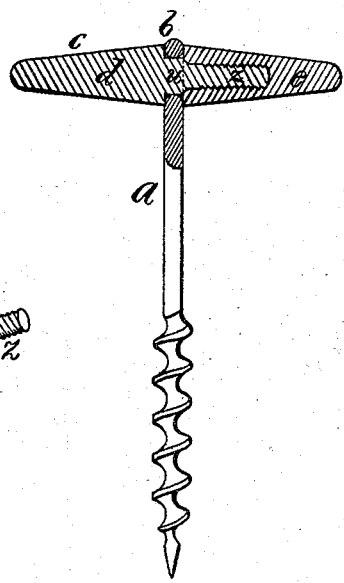
Fig. 4.
Fig. 5.
Fig. 2.
WITNESSES.
Villette Anderson.
George E. Upham.
INVENTOR.
Chas. L. Griswold
Chipman Hosmer & Co.
Attys

UNITED STATES PATENT OFFICE.

CHARLES L. GRISWOLD, OF CHESTER, MASSACHUSETTS.

IMPROVEMENT IN GIMLET-HANDLES.

Specification forming part of Letters Patent No. 143,142, dated September 23, 1873; application filed June 28, 1873.

*To all whom it may concern:*

Be it known that I, CHARLES L. GRISWOLD, of Chester, in the county of Middlesex and State of Massachusetts, have invented a new and valuable Improvement in Gimlet-Handles; and I do hereby declare that the following is a full, clear, and exact description of the construction and operation of the same, reference being had to the annexed drawings making a part of this specification, and to the letters and figures of reference marked thereon.

Figure 1 of the drawings is a representation of a cross-section of my gimlet-handle. Fig. 2 is a longitudinal section of the same. Fig. 3 is a view of a gimlet. Figs. 4 and 5 are, respectively, views of the separate halves of my gimlet-handle.

This invention has relation to gimlets, screw-drivers, and other small tools which are operated by rotary movement; and it consists in the construction and novel arrangement of the hook at the end of the shank and the transverse male and female screw forming the handle.

The object of this invention is to provide a handle which can be packed in small compass and readily applied to a variety of tools of the character mentioned, the shanks of said tools having been suitably fashioned in the hook form.

In the accompanying drawings, the letter $a$ designates the shank of the tool, the end of which is bent to form a hook, as shown at $b$. $c$ indicates the handle. This consists of the sections $d$ and $e$, the former of which is provided with the screw-stem $z$, connected to the handle portion by the enlargement $u$, which is designed to fit the span of the hook $b$ of the shank $a$. The section $e$ is perforated and threaded internally to receive the screw-stem $z$ of the section $d$. Both sections are provided with the shoulders or faces $v$, designed to engage with the sides of the hook $b$ and hold the same firmly in place when the said sections are screwed together.

The opening of the hook between its end and the shoulder of the shank where the bend commences is designed to be less than the diameter of the enlargement $u$ ordinarily, and greater than the diameter of the screw-stem $z$. This is to enable the hook to be slipped on its seat without disconnecting the sections, and, when located thereon, to prevent its displacement without separating the sections sufficiently for the purpose.

What I claim as new, and desire to secure by Letters Patent, is—

As an improvement upon my patent of November 26, 1872, the hooked shank $b$, adapted to embrace the enlargement $d$ and be clamped between the sections of the handle, substantially as shown and described.

In testimony that I claim the above I have hereunto subscribed my name in the presence of two witnesses.

CHARLES LEE GRISWOLD.

Witnesses:
SAMUEL A. WRIGHT,
HENRY W. CHURCHILL.